May 18, 1937.　　　F. WALTHER　　　2,080,643
MULTIPLE SPINDLE BORING MACHINE
Filed Nov. 8, 1934　　　6 Sheets-Sheet 2

Inventor:
Fritz Walther

May 18, 1937.  F. WALTHER  2,080,643
MULTIPLE SPINDLE BORING MACHINE
Filed Nov. 8, 1934  6 Sheets-Sheet 3

Inventor:
Fritz Walther

May 18, 1937.  F. WALTHER  2,080,643
MULTIPLE SPINDLE BORING MACHINE
Filed Nov. 8, 1934   6 Sheets-Sheet 4

Inventor:
Fritz Walther
Attorney.

May 18, 1937.  F. WALTHER  2,080,643
MULTIPLE SPINDLE BORING MACHINE
Filed Nov. 8, 1934  6 Sheets-Sheet 5
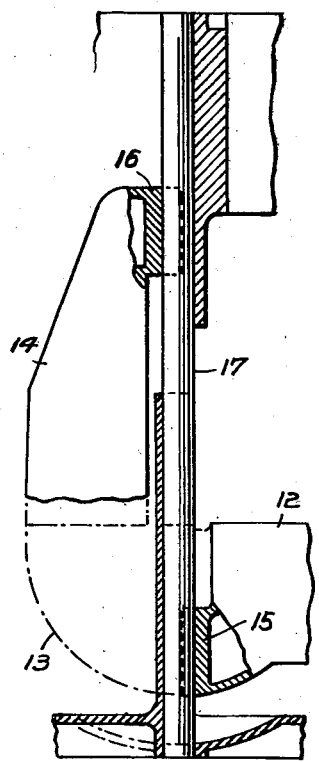
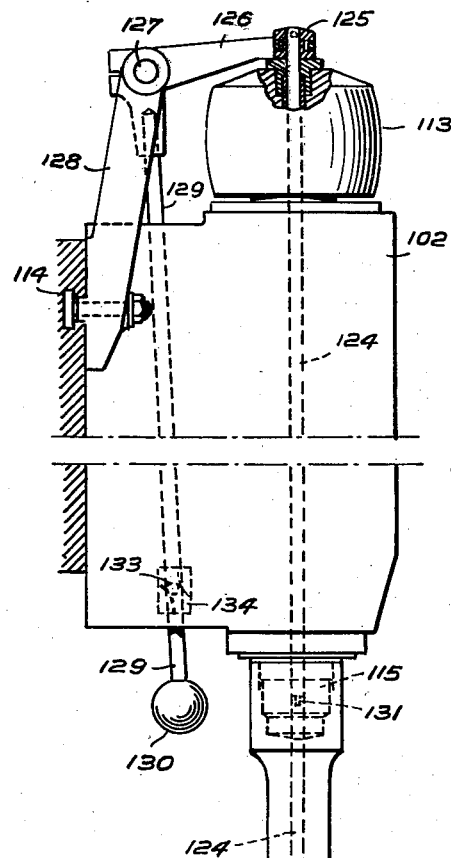
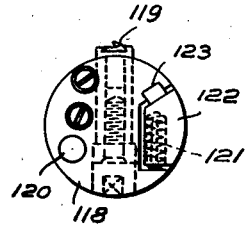
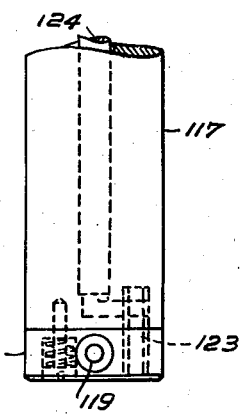
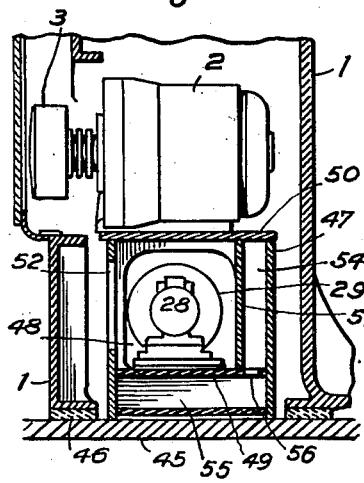
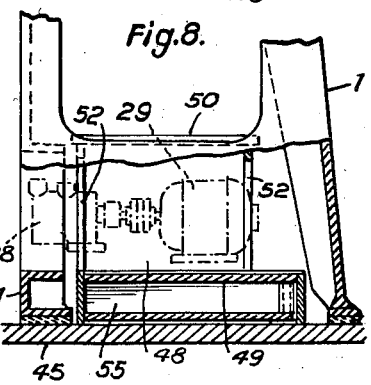
Inventor:
Fritz Walther May 18, 1937.  F. WALTHER  2,080,643

MULTIPLE SPINDLE BORING MACHINE

Filed Nov. 8, 1934   6 Sheets-Sheet 6

Inventor:
Fritz Walther
By
Attorney,

Patented May 18, 1937

2,080,643

UNITED STATES PATENT OFFICE 2,080,643

MULTIPLE SPINDLE BORING MACHINE

Fritz Walther, Plauen in Vogtland, Germany, assignor to Vomag-Betriebs-A. G., Plauen in Vogtland, Germany Application November 8, 1934, Serial No. 752,131
In Germany February 2, 1934

5 Claims. (Cl. 77—63)

The present invention relates to boring and drilling machines.

Boring mechanisms with vertical spindle are usually made so that the work to be bored or drilled is mounted on a fixed or adjustable table and the rotating boring spindle which carries the drill or boring tool is moved towards the work. In view of the fact that the spindle rotates, and as the accuracy of the boring or drilling depends on the rotation of the spindle about a constant axis, this arrangement, in the case of precision boring mechanisms in which only very small boring tolerances are allowed, leads to difficulties because no accurate guiding of the comparatively small spindle is possible, the more so as the axial guiding of a revolving part is rendered difficult if a high degree of precision is to be attained.

According to the present invention this drawback is eliminated by making the spindle bearing and the spindle itself stationary in an axial direction and firmly mounting them on the frame of the machine, the table with the work being moved axially in relation to the spindle. This has the advantage that the relatively large table can be mounted in accurate guides on the frame, and consequently an accurate motion of the work in the direction of the axis of the spindle is ensured.

If it is desired to design such boring machines with several spindles for boring simultaneously a number of bores in the same work, for example for the precision boring of cylinder blocks having several cylinders, a difficulty arises in fixing the spindle bearings to the frame of the machine. On the one hand rigid fixing is required if the necessary degree of accuracy is to be achieved; on the other hand such rigid fixing of the individual spindle bearings to the machine frame in arrangement such as hitherto employed calls for the use of somewhat large brackets or bearings for carrying the spindles, with the result that the minimum distances obtainable between the axes of the spindles are actually considerable.

The present invention also remedies this disadvantage and permits of an entirely satisfactory and reliable mounting of the spindles on the frame of the machine, although the axes of the spindles are comparatively close to each other, and at the same time permits of adjusting the distance between the spindle axes. For this purpose, according to the invention the spindle carrying bodies are so constructed that they may be placed side by side to form one compact unit, said bodies being individually undisplaceable in the axial direction, but the said unit being arranged adjustably as a whole, on the frame of the machine.

The drawings show a form of the invention by way of example, viz:

Fig. 1a is a side view of a table feed control device.

Fig. 6 is a detailed illustration of a part of Fig. 2, on an enlarged scale.

Fig. 7 shows the lower portion of the frame with the arrangement of the motor, on an enlarged scale partly in section.

Fig. 8 is a part sectional view through Fig. 7.

Fig. 11 shows an individual spindle of the arrangement in accordance with Figs. 9 and 10, seen with the boring-tool holder fitted thereto.

Fig. 12 is a view from below of the cutting tool holder on an enlarged scale, and Fig. 13 an enlarged illustration of the lower portion of Fig. 11.

Figure 1:
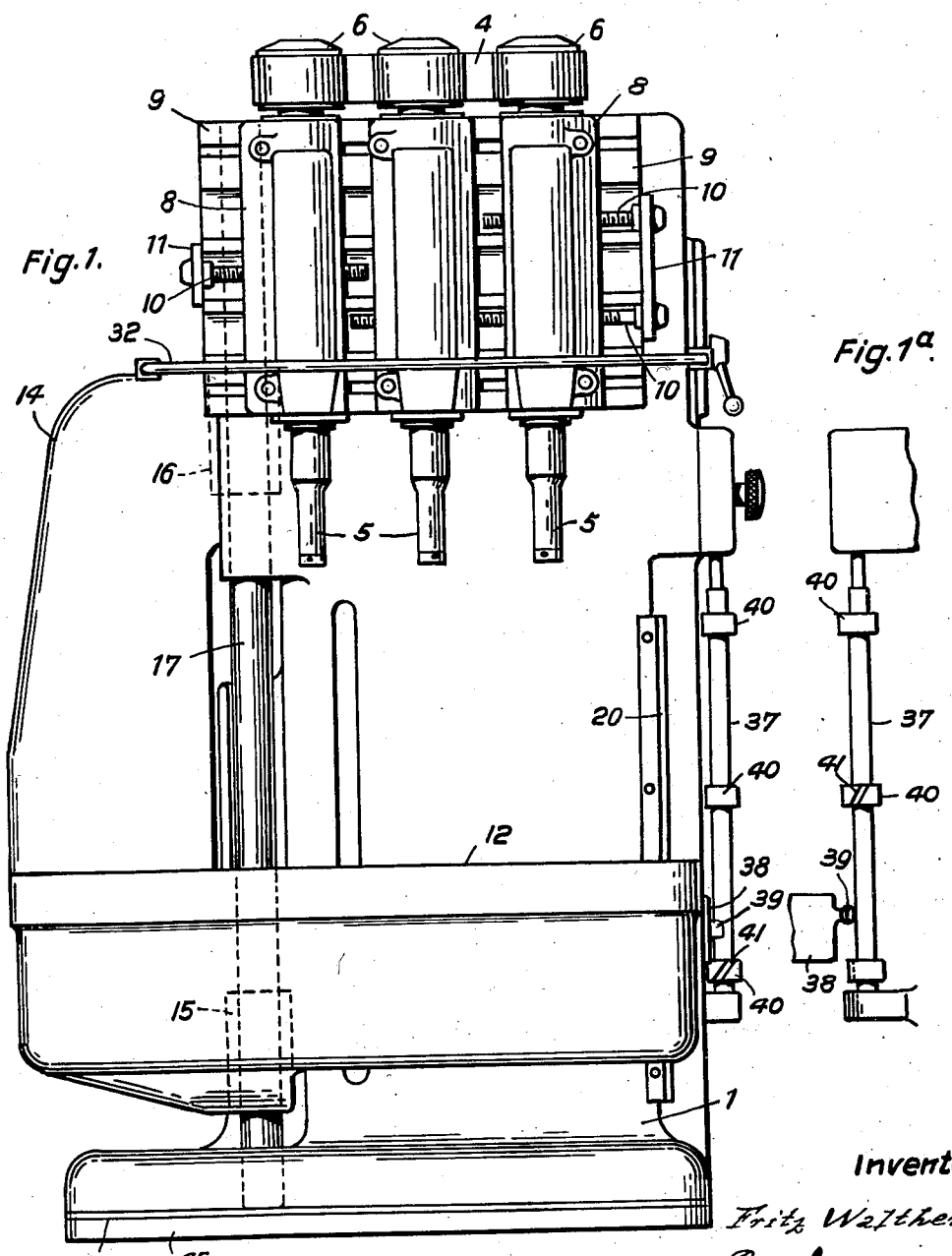
Fig. 1 is a front view of a three-spindle machine.
Figure 5:
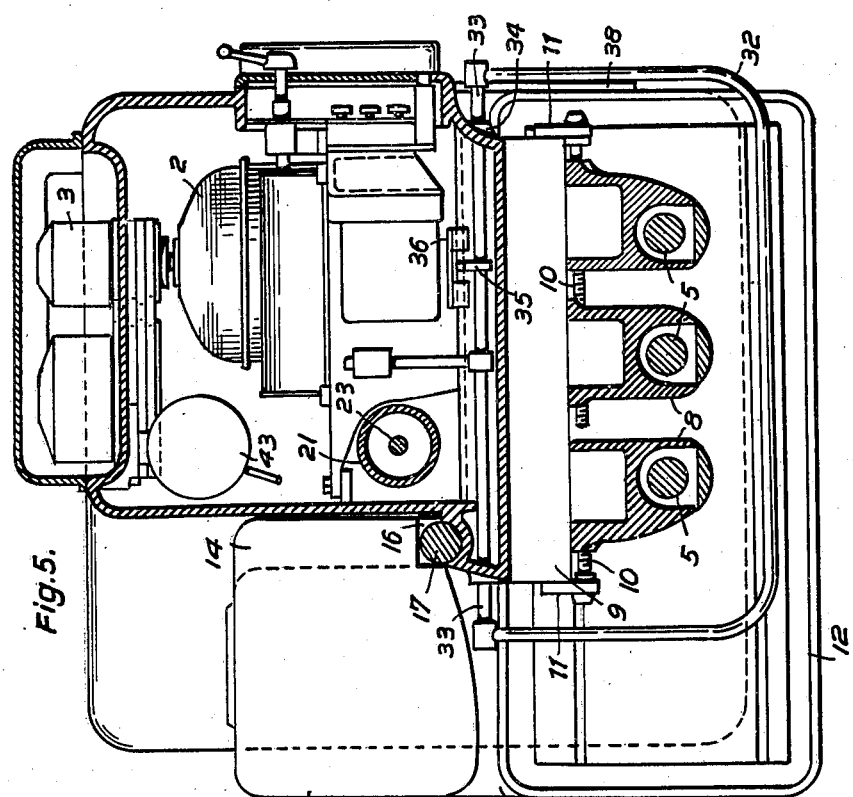
Fig. 5 is a section through Fig. 3 along the line 5—5.

In the drawings, 1 is the frame of the machine. Inside the frame is an electric motor 2 (Figs. 3, 5, and 7) which drives the boring spindle 5 through a belt pulley 3 and a belt 4. For this purpose the spindles carry belt pulleys 6, and belt 4 is guided between these pulleys 6 via guiding rollers 6', (Fig. 2) so that a single belt can be used for driving all spindles. The individual boring spindles are mounted in bearings 8, and the bearings are arranged on a common base plate 9, which is connected rigidly to the frame or made in one piece with it. Consequently, no axial displacement of the boring spindles can take place, whilst the spindles can be adjusted horizontally on the base plate. For this purpose threaded spindles 10 (Figs. 1 and 2) are arranged in the base plate, which spindles are so secured in lateral bearing plates 11 placed on the base plate that they are rotated inside them, but not displaceable axially in relation to them. The threaded spindles engage in the nuts provided on the bearings 8, and each bearing is provided with a nut, that is to say, there is a spindle 10 for each nut or each bearing. Accordingly, by rotating these spindles, the bearings 8 with the boring spindles can be displaced individually in a horizontal direction along the plate 9.

Figure 2:
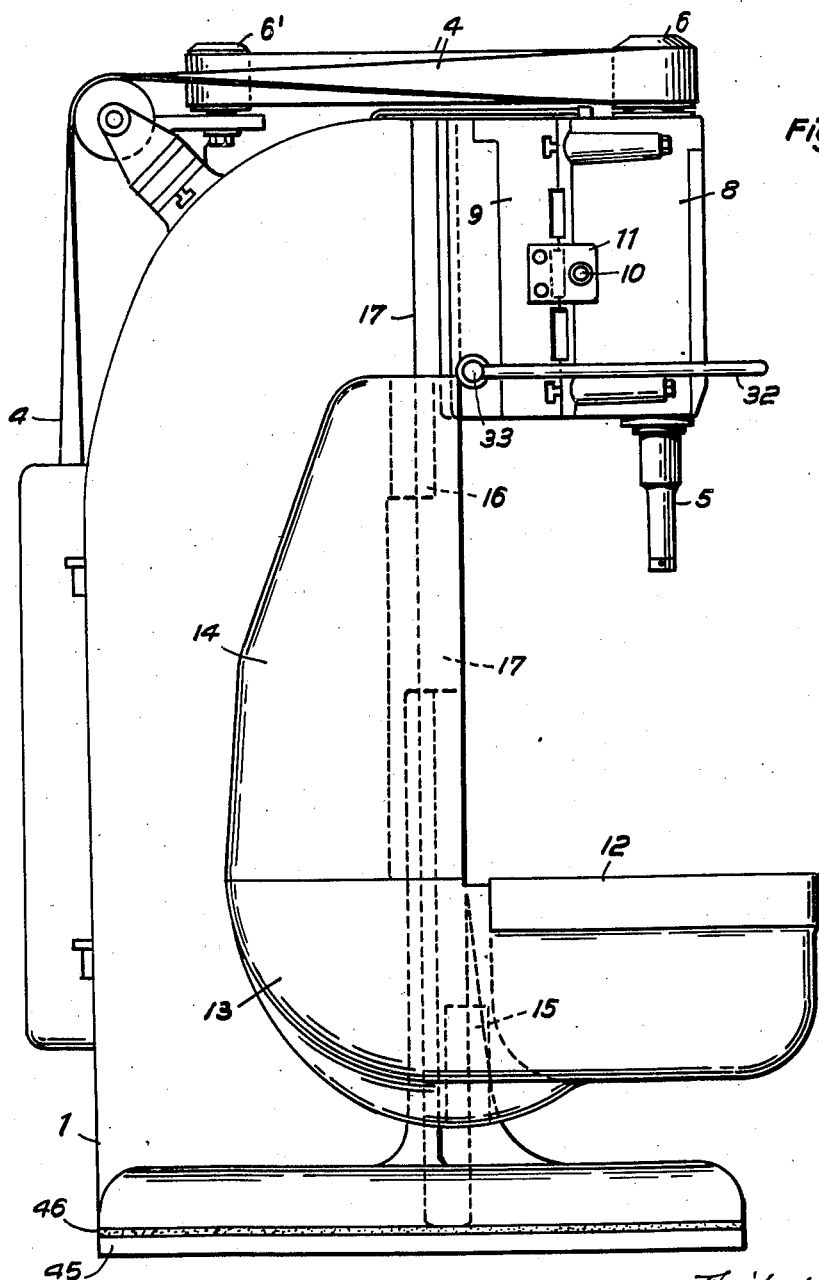
Fig. 2 is a side view of same.
Figure 3:
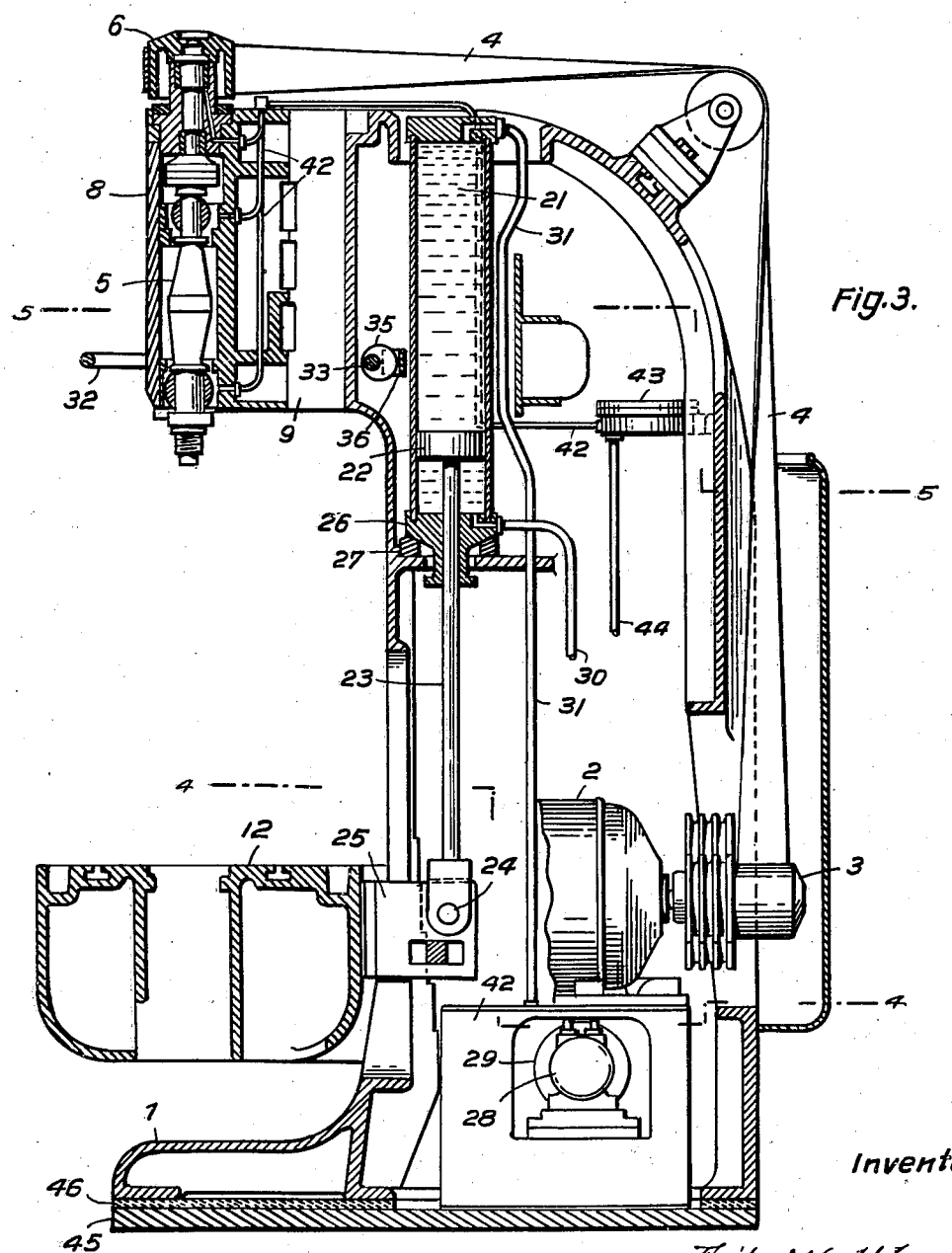
Fig. 3 is a vertical section through Fig. 1.
Figure 4:
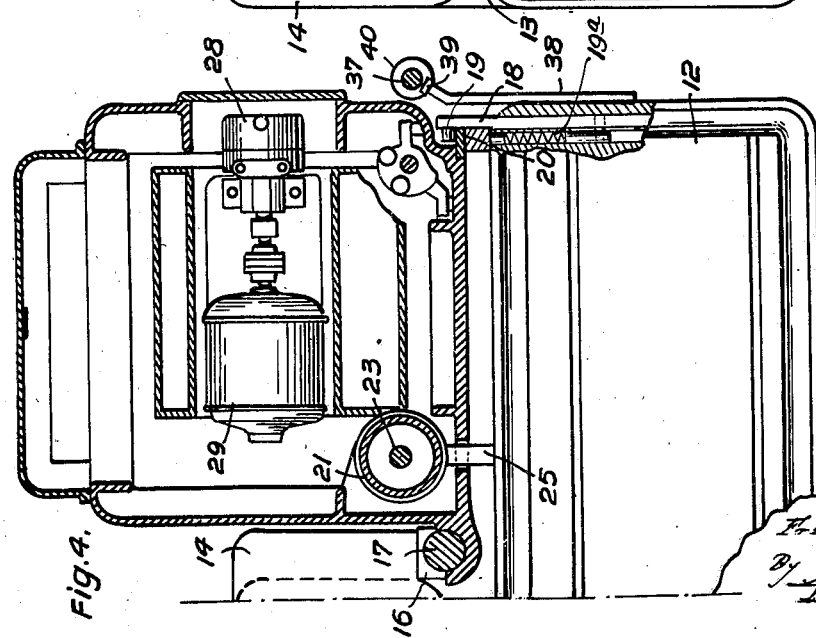
Fig. 4 is a section through Fig. 3 along line 4—4.

The work to be dealt with rests on the table 12, which is guided vertically on the machine frame 1. The table is of L-shaped outline as seen in plan in Fig. 5 that is to say, it carries a part or arm 13 projecting rearward which at the same time, as shown in Fig. 2 forms an arm pointing upwards. This arm 13 carries two hook- or claw-like bearings 15 and 16 (Fig. 6) which slidingly engage on opposite sides of a guide rod 17 mounted rigidly in the machine frame, the bearing 15 being disposed at the lower part of the arm 13 and at the front of the rod 17, and the bearing 16 at the upper part of said arm and at the rear of the said rod, so that the weight of the table 12 provides a torque which presses both bearings against the guide rod 17. On the other side of the table 12 is provided a frame 18, which frame carries a shoulder 19 projecting inwards (Fig. 4), the said frame and shoulder forming a hook-shaped part. The shoulder rests against a guide bar 20 arranged on the machine frame. A spring 19a or the like can be provided which holds parts 19 and 20 in engagement with each other. When in upward and downward motion, the table thus slides along the guide rod 17 and the guide bar 20.

The up and down motion of the table is, in the example illustrated, carried out hydraulically. For this purpose a hydraulic cylinder 21 (Fig. 3) is provided in which runs a piston 22. The piston is linked to a shoulder 25 of the table through the piston rod 23 by means of an articulated pin 24. The lower end 26 of the cylinder is provided with a spherical cap which rests on a spherical supporting surface 27 of the frame, so that the cylinder 21 can adjust itself freely, without exerting any reaction upon the table.

Naturally the hydraulic control shown, for the up and down motion of the table, is only one form of the invention. Mechanical or electrical means, for example a rack or friction drive can also be used for this purpose. The illustrated guiding of the table on the frame by means of the guide parts 16 and 17 has the special advantage that owing to these parts being arranged wide apart from one another the supporting pressure against the guide rod is comparatively small and no great wear takes place. The guide surface 20 receives practically no pressure, its chief purpose is to prevent the table from rotating round the guide rod 17 and so maintain it in its correct relationship with respect to the frame of the machine.

The guide rod 17, in the example shown, is of round cross-section, but may, if desired, be of any other cross-section.

The fluid for working the piston 22 is produced by a pump 28, which is disposed inside the machine frame and is driven by a motor 29. The feed and discharge of the fluid to and from the cylinder 21 is respectively effected through the tubes 30 and 31, or vice versa according to the position of a reversing and control valve not shown in the drawings.

The control is actuated by means of a substantially U-shaped body or handle 32 (Figs. 1, 2, 3, and 5) which is carried on a shaft 33 pivoted in the machine frame. By rotating the shaft 33 by means of the handle 32 the control valve may be operated to connect or disconnect the pressure oil feed with the pipes 30 and 31, the arrangement being such that by turning the handle 32 downwards, the piston 22 and consequently the table is raised and by turning said handle upwards the table is lowered. When the handle 32 is in the horizontal position, the table is in the position of rest.

By moving the handle 32 longitudinally, the shaft 33 can also be axially displaced in its bearing 34 on the machine frame, the said shaft carrying a stop 35 or the like (Fig. 5) which can be brought into engagement with a switch 36. The switch is in the form of a push-button switch, and by pressure applied to one or other of the two lateral parts, according to the direction of movement of the handle 32, the driving motor 2 of the device is either switched on or switched off.

As previously stated, the control of the pressure medium by means of the handle 32 is effected via a control device (not shown in the drawings), which valve can be set in five different positions. If the handle is moved slightly downward from its central position the current of fluid flows into the part of the cylinder 21 below the piston 22 and raises the table, the fluid in the upper part of the cylinder passing into a suitable tank or reservoir, not shown.

When the handle is moved down slightly above its horizontal position, it places the lower end of the cylinder in communication with the reservoir, so that the liquid which is in the cylinder 21 returns to the reservoir mainly under the action of the weight of the table.

When the handle is in the horizontal position, the control valve is set so that the pressure medium supplied by the pump is circulated through the pump and reservoir only, while the liquid still remaining in the pipes 30, 31 and in the cylinder is shut off from both the pump and reservoir, the arrangement being such that the movement of the table may be stopped when the latter is at any level.

In order to move the table more rapidly towards the cutting tools and to bridge over more rapidly intervals between the working strokes of the machine, the table may be lowered at high speed by moving the handle into its extreme upper and lower positions.

The handle 32 is operatively connected by a device, not shown in the drawings, for example, a pair of bevel wheels, to a vertical control rod 37 mounted on the side of the machine, in such a manner that by turning the rod 37 the handle 32 is swung on its pivot. By means of a bracket 38, (Figs. 1, 1a, and 4) a shoulder or a roller 39 is arranged on the table 12 of the machine, and a number of collars 40, that is to say, three in the example shown, which can be adjusted on the rod as to height and can be fixed in the adjusted position by means of a locking screw or the like, which collars have, at their periphery, an oblique, that is to say, screw-shaped groove 41, in which the said shoulder 39 can engage. During the up and down motion of the table the shoulder 39 engages in these grooves 41 and as a result rotates the rod 37. Through this rotation, owing to the connection of the rod with the handle 32, the latter is correspondingly moved. The collars and grooves 41 are so arranged that by properly adjusting the collars on the rod 37 the change-over to high speed or ordinary speed or to rest is initiated at the respective levels at which the grooves of these collars are engaged by the shoulder 39. Of course it is also possible at any time while the shoulder 39 is between two collars, to effect the change-over by the manual operation of the handle 32.

The spindles 5 (Fig. 3) are mounted in ball bearings to which the oil is fed through a pipe system 42 from an oil distributing device 43. This device receives the oil from the pump through a pressure pipe 44.

The frame 1 is mounted loose on a base plate 45, with the interposition of an insulating layer, for example, a sheet of cork 46, which serves to prevent the transmission of the motor vibrations to the machine frame. The motor 2 is mounted on a frame 47, which is placed on the base plate 45. The frame 47 is designed as a hollow body containing a space 48 which is divided off from the lower portion 55 of the inside of the said frame by a base plate 49 and is closed at the top by a plate 50, which latter at the same time forms the supporting surface for the motor 2.

A vertical partition 51 (Fig. 7) is also provided within the frame 47. The front and side walls of the frame 47 are provided with windows such as 52, which give access to the interior of the space 48. In the space 48 and upon the partition 49 is accommodated the pump 28 together with the appertaining electric motor 29. Behind the wall 51 and under the wall 49, spaces 54 and 55 are provided, which are in communication with each other through an opening 56. These spaces serve as oil containers, from which the pump 28 is fed. The individual plates of the frame 47 can appropriately be connected by means of welding.

In Figs. 9 to 13 is shown a machine with six boring spindles, which is intended for example for the precision boring of blocks of six cylinders.

The individual spindles 101 are carried in bearings housed in bodies in the form of blocks 102, which are rectangular in plan. Each of these blocks is guided on the machine frame by means of a bar 102a which can be individually adjusted transversely of the machine. The distance between the individual blocks is determined by the thickness of interchangeable distance pieces 103, the arrangement being such that the distances between the various boring spindles may be adjusted for any requirement. The blocks 102 by being arranged in juxtaposition form a spindle unit, which is disposed between members 104 between which are secured adjustable tie-bars 105, as shown in Fig. 10.

Figure 9:
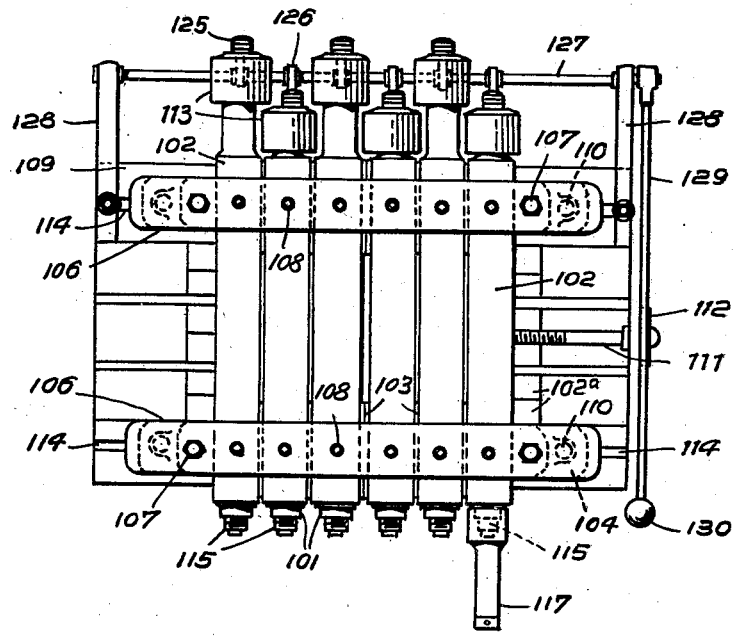
Fig. 9 is a front view of the upper portion of a machine forming a modification.
Figure 10:
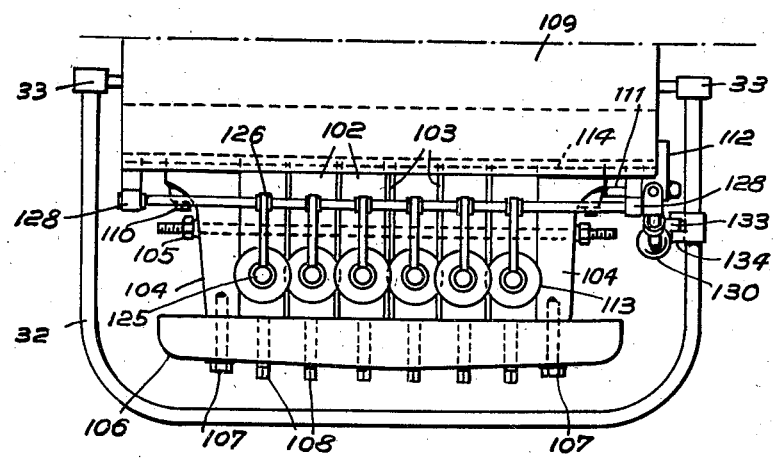
Fig. 10 is a plan of same.

At the front of the spindle unit, transverse members 106 are provided, which extend across the whole unit and are connected to the members 104 by means of screws 107, (Figs. 9 and 10). Through the members 106 are passed screws 108 by which the individual blocks 102 are firmly pressed against the body 109 arranged on the machine frame. The whole unit, composed of spindles, bearings, blocks 102, members 104, 106, is maintained on the body 109 by screws 110, (Figs. 9 and 10), but in such a manner that the whole unit can be displaced laterally. For this purpose, the screws 110 are made to engage in slots 114 (shown more clearly in Fig. 11) in the body 109. A screw-threaded spindle 111 carried by a bracket 112 serves for displacing the whole unit. The drive of the individual spindles is effected in the example shown, by means of pulleys 113 arranged in staggered formation in regard to height, two driving belts being employed, each of which serves for three spindles and both of which belts can be driven from a common drive pulley.

The spindle noses 115 projecting below from the spindle bearings are provided with a thread on to which is screwed the boring rod. The individual boring rods are made of two sections; they consist of the shaft 117 and a cutting tool holder 118 pivoted on the latter. The cutting tool is marked 119. As will be seen from Fig. 12, the cutting tool holder is pivoted on a pin 120; a spring 121 tends to rotate the cutting tool holder in a clockwise direction.

Between the cutting tool holder and a shoulder 122 provided on the shaft 117 there is a wedge 123 which can be moved up and down in a vertical direction by means of a pressure rod 124. Owing to this up and down motion of the wedge-like pressure member 123, the cutting tool holder is swung out against the action of spring 121 in such a way that the tool 119 is moved out of contact with the bore.

At its upper end the pressure rod 124 carries a head 125 which is provided with an annular slot and into which the fork-like end of a lever 126 engages. Each spindle is provided with such a device and all the levers 126 are firmly fixed on a common shaft 127 which is mounted in arms 128 on the machine frame. The shaft 127, moreover, carries a lever 129 at the lower end of which a knob 130 is provided, the latter forming a handle.

The pivoting of the lever 129 by means of the knob or handle 130 causes the shaft 127 to be turned and in consequence all the pressure rods 124 are simultaneously raised and lowered.

The device last described serves, upon completion of the boring operation, to move all the boring tools simultaneously out of contact with the work in order to enable the spindles to be removed from the bores without damage to the latter, when lowering the table which carries the work.

Instead of the individual blocks 102 being square they can be cylindrical, or even octagonal or the like in plan, the distance pieces 103 being so shaped that they fit well on to adjacent blocks.

If desired, an individual drive in the form of an electric motor or other driving unit may be provided for each spindle. Finally a device can also be provided to adjust the whole spindle unit not only horizontally, but vertically, that is to say, spindles according to this invention can also be used for machines in which the feed of the boring tool is effected by an axial movement of the boring spindles themselves, all the spindles in such case moving towards the work simultaneously. Finally, the device can also be used for horizontal boring work.

Each of the pressure rods 124 is appropriately designed in two parts, and the two parts are screwed together, at 131, (Fig. 11), that is at the point where the spindle also is screwed on the thread 115 of the spindle nose, so as to facilitate the exchange of the spindle and, if necessary, to permit of also using spindles which do not possess the withdrawal device.

It is good plan to operatively associate the control of the machine through the handle 32, with the lever 129 for the purpose of lifting off the cutting edges. Since, during the upward motion of the table, that is to say, during the working operation, the cutting edges must be in the working position, while on the contrary during the downward motion of the table they must be in the withdrawn position. The handle 32 may, therefore, be connected with the hand lever 129 in such a way that simultaneously with the upward and downward swing it will also respectively bring the cutting edges into their cutting position and retract them from this position, and to this end, for example a lateral roller or a projection 133, can be provided on the lever 129 (see Figs. 10 and 11) which roller or projection is operated by a cam 134 attached to the handle 32.

The arrangement is such that swinging the handle 32 upward, the lever 129 is moved by the cam 134 in such a way that the cutting edges become retracted, while on the contrary when the handle 32 is moved back into the middle position, the lever 129 is so moved that the cutting edges are re-engaged. The lever 129 remains in this position during the further downward motion of the handle 32 and during the upward movement of the table initiated thereby.

Obviously the machine may be provided with any other number of spindles than in the examples above described, or even with only one spindle.

Further, it is also possible, in very large machines, to arrange spindles in sets, that is to say, to assemble, say sets of three or four spindles into one unit and to provide several such units on the same machine.

It is further possible to design on different constructional lines the means for clamping together the blocks 102 or for setting the latter in their correct position, that is to say, instead of employing a screw-threaded spindle such as 111, suitable rack and pinion mechanism may be provided for this purpose.

I claim:—

1. A boring machine comprising, a frame, a boring spindle mounted thereon stationary in the axial direction of the spindle, a work table movable parallel to the axis of the spindle, a single guide rod extending parallel to the axis of the spindle at the one side of the table, an arm extending from the table parallel to said rod at the same side of the table, a pair of bearing surfaces longitudinally spaced from each other on said arm, one of which bears against the front of said rod and the other of which bears against the back of said rod, guiding surfaces at the other side of the table and of the frame respectively engaging each other, and means adapted to resiliently press said last-mentioned guiding surfaces against each other.

2. A boring machine comprising a frame, a vertical boring spindle mounted thereon stationary in the vertical direction, a vertically movable work table, a single vertical guide rod at the one side of the table, an arm extending upwardly from the table at the same side, and a pair of bearing surfaces vertically spaced from each other on said arm, one of which bears against the front of said rod and the other of which bears against the back of said rod, guiding surfaces at the other side of the table and of the frame respectively engaging each other, and means adapted to resiliently press said last-mentioned guiding surfaces against each other.

3. A machine according to claim 2 in which the guide rod is fixed in the machine frame near the back of the work table.

4. A boring or drilling machine comprising, a frame, a boring spindle mounted thereon stationary in the axial direction of the spindle, a work table movable parallel to the axis of the spindle, means for guiding the work table at one side thereof, means for holding the work table resiliently against said guide means, a single guide rod extending parallel to said guide means at the other side, and a pair of boring surfaces longitudinally spaced from each other on said arm, one of which bears against the front of said rod and the other of which bears against the back of said rod, said guide rod being of circular cross section and the guide means including a flat surface on the frame and a hook-shaped part on the table engaging said surface.

5. A boring or drilling machine comprising a frame, a boring spindle mounted thereon stationary in the axial direction of the spindle, a work table movable parallel to the axis of the the spindle, a single guide rod extending parallel to said axis, an arm extending from the table parallel to the guide rod, a pair of bearing surfaces longitudinally spaced from each other on said arm, one of which bears against the front of said rod and the other of which bears against the back of said rod, and power means for moving the work table comprising a cylinder arranged with its axis parallel to the direction of table movement said cylinder having a spherical surface engaging a corresponding spherical bearing surface on the frame to compensate for non-parallelism of said cylinder axis and the direction of table movement, said cylinder having a piston operatively connected to the work table at a point located inwardly of the inner edge of the table.

FRITZ WALTHER.